United States Patent
Reichert et al.

(10) Patent No.: US 6,656,630 B2
(45) Date of Patent: Dec. 2, 2003

(54) FORMED IN SITU SEPARATOR FOR A BATTERY

(75) Inventors: Samuel Firestone Reichert, Brunswick, OH (US); Bernice Shou-Hua Chang, Westlake, OH (US); Kevin Keough, Canton, MA (US); Andrew C. Harvey, Waltham, MA (US); Robert Francis Kovar, Waltham, MA (US); Thomas M. Tiano, Hudson, NH (US)

(73) Assignee: Eveready Battery Company, Inc., St. Louis, MO (US)

(*) Notice: Subject to any disclaimer, the term of this patent is extended or adjusted under 35 U.S.C. 154(b) by 115 days.

(21) Appl. No.: 09/792,847

(22) Filed: Feb. 23, 2001

(65) Prior Publication Data

US 2001/0012580 A1 Aug. 9, 2001

Related U.S. Application Data

(63) Continuation of application No. 09/216,571, filed on Dec. 18, 1998, now Pat. No. 6,203,941.

(51) Int. Cl.⁷ .............................................. H01M 2/16
(52) U.S. Cl. ...................... 429/137; 429/131; 429/206
(58) Field of Search ................. 429/137, 206, 429/131

(56) References Cited

U.S. PATENT DOCUMENTS

| | | | |
|---|---|---|---|
| 789,557 A | * 5/1905 | Meygret | 429/246 |
| 3,023,261 A | * 2/1962 | Louis et al. | 429/137 |
| 3,652,338 A | 3/1972 | Charkey et al. | 136/146 |
| 3,861,963 A | 1/1975 | Afrance et al. | |
| 3,892,594 A | * 7/1975 | Charlesby et al. | 427/58 |
| 4,288,913 A | 9/1981 | Parsen et al. | 29/623.5 |
| 4,310,608 A | 1/1982 | Dodin et al. | 429/131 |
| 4,315,062 A | 2/1982 | Clarizio | 429/246 |
| 4,524,509 A | 6/1985 | Wegner | 29/623.5 |
| 4,530,890 A | * 7/1985 | Rampel | 429/217 |
| 5,348,820 A | * 9/1994 | Suga et al. | 429/216 |
| 5,382,482 A | * 1/1995 | Suga et al. | 429/206 |
| 5,382,483 A | 1/1995 | Suga | 429/206 |
| 5,700,300 A | 12/1997 | Jensen et al. | |
| 5,837,015 A | 11/1998 | Venugopal et al. | |
| 5,910,366 A | 6/1999 | Chowdhury et al. | 428/379 |

FOREIGN PATENT DOCUMENTS

| | | |
|---|---|---|
| EP | 0814520 A2 | 12/1997 |
| EP | 0814520 A3 | 12/1999 |
| GB | 395456 | 7/1933 |

\* cited by examiner

*Primary Examiner*—Carol Chaney
(74) *Attorney, Agent, or Firm*—Stewart A. Fraser

(57) ABSTRACT

A battery including a polar solvent transportive, ionically conductive separator formed directly on an electrode is prepared by applying a coating composition containing a polymer or gel dispersed in a polar solvent directly to the electrode surface and solidifying materials in the coating composition to form a separator membrane.

2 Claims, 1 Drawing Sheet

FORMED IN SITU SEPARATOR FOR A BATTERY

CROSS-REFERENCE TO RELATED APPLICATION

This application is a continuation of application Ser. No. 09/216,571, filed Dec. 18, 1998 which issued Mar. 20, 2001 as U.S. Pat. No. 6,203,941 B1.

FIELD OF THE INVENTION

This invention relates to batteries and, in particular, to separators for alkaline cells.

BACKGROUND OF THE INVENTION

Alkaline batteries are generally cylindrical in shape and include an annular cathode disposed between the outer casing of the battery or can, and the anode material which occupies a cylindrical volume having a longitudinal axis generally coincident with that of the battery and can. Located between the cathode and the anode material is a separator which electrically insulates the cathode from the anode material, but which absorbs electrolyte and allows water transport and ion transfer between the electrodes. Heretofore, the separators used in alkaline batteries have generally been limited to commercially available battery separator papers and cellophane films.

While conventional battery separator paper has proven satisfactory, it would be desirable to provide methods and materials which would allow the separator to be installed at a lower cost using a simplified process and apparatus. In particular, the equipment used to cut and place the paper separators into the batteries are relatively complicated and expensive. Additionally, preparing the equipment used to cut and place the paper separators into the batteries requires sampling of the paper used to form the separators and adjustments of the equipment depending on the particular properties of the paper being used. Another problem with the use of paper separators is that process reliability is sensitive to the internal diameter of the cathode. For example, variations in the internal diameter of the cathode along the longitudinal length of the battery can result in areas wherein the separator does not intimately contact the cathode. Also, changes in anode basket volume affects cell performance. As a result, the interfacial area for ionic transport may be substantially reduced as compared with a battery having a separator basket with an internal diameter which does not vary along either the longitudinal or radial direction and wherein the separator is substantially in continuous contact along the entire internal cylindrical surface of the cathode. Another problem with paper separators is that because of the relatively complicated manipulations require to place the separators into the batteries, long process cycle times are required and process capability is generally low and varies widely between machines and even for any particular machine. A still further disadvantage with paper separators is that the paper takes up a substantial amount of volume within the cell, which, in turn, requires a substantial amount of electrolyte to wet the separator. Paper separators work optimally when wet and less efficiently when only damp. Also, the paper does not intimately contact the cathode over the entire cathode/separator interface, especially at the bottom of the separator where the folds occur, creating unused volume within the cell. Side seams of conventional paper separators also consume cell volume. A still further disadvantage with conventional paper separators is that the defect rate is greater than desired.

An alternative method for preparing an electrochemical cell which does not involve the use of a paper separator involves forming a polystyrene separator by placing a predetermined amount of polystyrene solution directly on the surface of a cathode and removing the organic solvent, thereby leaving a substantially continuous coating on the surface of the cathode. This method is generally undesirable and impractical because it typically requires placement of a reinforcing means on the surface of the cathode before application of the solution containing polystyrene, and requires evaporating large quantities of volatile organic solvents such as methylene chloride, tetrahydrofuran, ethyl acetate, acetone, benzene, toluene, and trichloroethylene. Placing of a reinforcing means on the surface of the cathode adds to the cost of the battery and requires complicated automation comparable to that required for automatically incorporating a paper separator into a battery. The use of volatile organic solvents is extremely undesirable due to health related issues (e.g., toxicity), safety related issues (e.g., flammability) as well as the difficulty and expense involved in avoiding environmental contamination. Some solvents if not entirely removed can detrimentally affect cell performance.

SUMMARY OF THE INVENTION

The invention has as an objective the provision of an improved method of constructing a battery using a separator which is installed within the battery without folding operations, and elimination of the various problems enumerated above relating to the use of conventional paper separators and polystyrene separators. A further objective of this invention is to provide batteries having improved volumetric efficiency, improved solvent transport characteristics across the separator, and improved ionic conductivity across the separator.

The above objectives are met, and the disadvantages with paper separators enumerated above are overcome by a battery having a separator formed directly on an electrode by applying a coating composition comprising a polymer or gel dispersed in a polar solvent to the surface of the electrode and solidifying materials in the applied coating composition.

These and other features, advantages and objects of the present invention will be further understood and appreciated by those skilled in the art by reference to the following specification, claims and appended drawings.

DETAILED DESCRIPTION OF THE PREFERRED EMBODIMENTS

The invention encompasses batteries having a separator which is formed directly on an electrode by applying a polar solvent based coating composition, such as an aqueous coating composition, to the electrode surface and allowing the coating composition to solidify. Although the invention will be primarily described with respect to cylindrical batteries, it is not limited to cylindrical shaped batteries, but instead may be applied to batteries of various other shapes. The expression "polar solvent based coating composition" refers to a composition which can be applied to a surface using liquid coating techniques, and wherein the solvent portion of the composition is comprised mostly of polar molecules. Examples of polar solvents include water, alcohol, and sulfuric acid. The invention hereinafter will, in general, be described with respect to aqueous coating compositions, it being understood that other polar solvents may be employed without departing from the spirit and scope of this invention.

The method involves using any of various conventional coating application techniques including, but not limited to, centrifugal casting, spinning disk coating, spray coating, slush molding, electrostatic spraying and thermoforming. Other application techniques which may be used include inverted can spray coating wherein the coating composition is sprayed vertically upwardly into an inverted battery can containing a cathode, dip coating wherein the battery can containing the cathode is filled with the coating material and excess coating material is subsequently poured out of the battery can, pad coating wherein an expandable cylindrical pad is dip coated with the coating composition and pressed against the inner surface of the cathode to transfer the coating composition to the cathode surface, brush coating, roll coating, slot extrusion coating wherein the coating composition is applied to the cathode surface from an extrusion die, vacuum forming, blow molding, and pour-in-place gelling wherein a gel precursor is poured into the cathode and a forming plug is thereafter inserted into the cathode followed by rapid curing, or a combination of these techniques. Presently preferred coating application techniques include ram molding, centrifugal casting, and spray coating.

Figure 1:
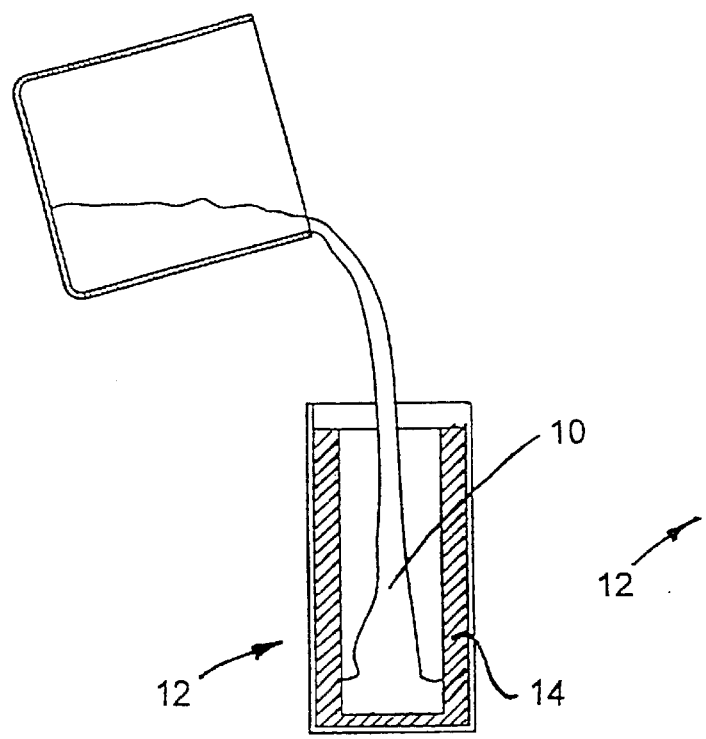
FIGS. 1–3 illustrate a method for forming a separator directly on a cathode by applying a coating composition to the cathode surface and allowing the coating composition to solidify.
Figure 2:
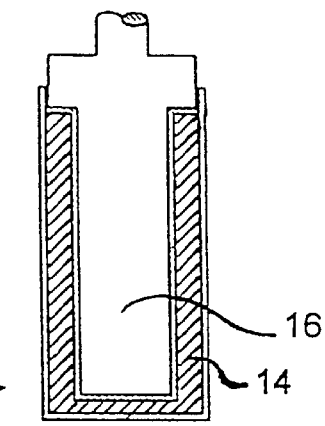
Figure 3:
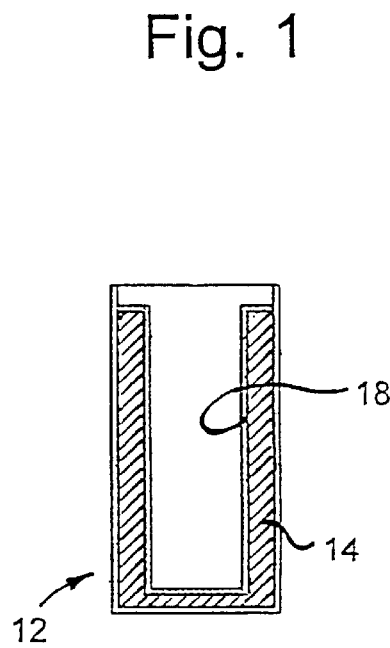
Figure 4:
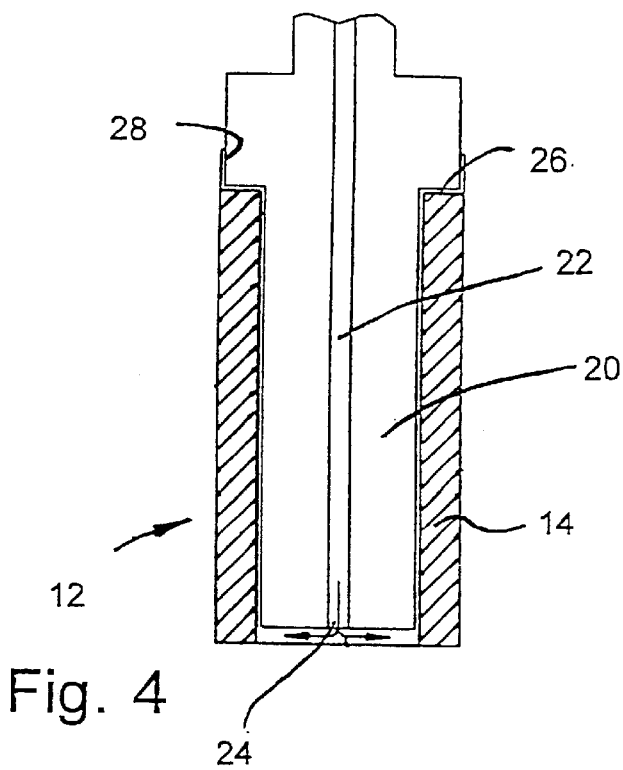
FIG. 4 illustrates an alternative apparatus for applying a coating composition to a cathode surface of an alkaline battery.

The ram molding technique for applying the coating composition to the internal surfaces of the cathode is illustrated in FIGS. 1–3. As shown in FIG. 1, the coating composition 10 is introduced into the bottom of a battery 12 having a cathode 14. Next, as shown in FIG. 2, a forming ram 16 is introduced into the cathode to cause the coating composition to flow up between the ram and the inner surface of the cathode. After the coating composition solidifies or sets, the ram 16 is removed from the battery 12, leaving a separator 18 which is formed directly on the cathode. In FIG. 4, there is shown an alternative forming ram 20 having an internal conduit or bore 22 with an outlet port 24 at a lower end thereof. The forming ram 20 is first inserted into the battery 12 having a cathode 14 as shown in FIG. 4. Thereafter, coating composition is introduced into the bottom of the battery through conduit 22 from outlet port 24. The coating composition flows through the ram, into the bottom of the battery, and up into the annulus between the ram and the inner surface of the cathode 14. The ram molding technique is believed to have several potential advantages. First, the shape of the formed separator 18 can be controlled by controlling the dimensions of the ram and the cathode internal diameter. Variations in temperature, viscosity, and solids loading in the liquid coating composition can be tolerated. This allows refinements in the coating composition to be made without changing the application process. The ram design can allow the shape of the separator to be tailored to improve performance characteristics. For example, the edges of the ram can be chamfered to decrease stress risers in the separator membrane. Also, the thickness of the membrane can be varied at different locations. The ram geometry allows the coating composition to be accurately applied over the top of the cathode shelf 26, along the sides 28, and on the bottom surface of the can. The anode volume formed by the ram molding can be very accurately controlled as compared with conventional batteries having a folded paper separator. The ram molding technique is well suited to continuous automated production.

Another desirable technique for applying the coating composition to the inner surface of the cathode is centrifugal casting or spin coating. This technique involves first introducing the coating composition into a cathode cup disposed in and integrally connected to a cylindrical can. Thereafter, the cathode cup and cylindrical can are rotated at a high speed, or may already be rotating at a high speed when the material is introduced. As the cathode rotates, the material flows up along the internal surface of the cathode and solidifies or cures in place. The axis of rotation of the cylindrical can in which the cathode is disposed may be at any angle between and including a vertical axis and a horizontal axis. The can may be inverted such that gravitational acceleration assists the flow of coating composition out of the can. Centrifugal casting is believed to have several advantages including even coating of the internal cathode surface regardless of surface irregularities on the cathode surface, filling of voids in the cathode surface such as where the cathode material spalls off during cathode molding, and the ability to provide fixed or predetermined separator material volume. The centrifugal casting technique is tolerant to loose particles of cathode material left from cathode molding. Another advantage of centrifugal casting or spin coating is that the internal surface of the separator will be very smooth.

Another desirable technique for applying the coating composition to the internal surface of the cathode is spray coating. With this technique, the liquid separator coating composition is sprayed onto the surface of the cathode and solidifies or cures in place. A major advantage of the spray coating process is its mechanical simplicity.

The aqueous separator coating composition may be an aqueous solution, gel, dispersion, slurry, or combination thereof which can be applied to liquid form using liquid coating application techniques, and which will solidify to form a separator directly on the cathode surface. Solidification of the coating composition refers to any process of drying, curing, gelling, cross-linking, polymerization, freezing (i.e., thermal solidification), or combination thereof which results in a stable electrically insulating barrier which will allow the ionic transport between the electrodes and will adhere to the cathode during the production and useful life of a battery. The solidified coating is preferably less than 0.020 inches thick, more preferably less than 0.005, with thinner coatings being desirable to maximize anode basket volume. The separator coating compositions preferably smooth out or fill any surface irregularities in the cathode surface and preferably have controllable thickness, including uniform and variable thickness.

An advantage with the formed in situ separators is that they are in intimate and complete contact with the electrode surface on which they are formed, i.e., the separator is in substantially continuous contact with the surface of the electrode upon which the separator is formed. This differs significantly from paper separators which normally have significant areas which are not in contact with adjacent electrode surfaces. The improved contact provided by the in situ formed separators provides enhanced ion transport properties and improved cell performance. The formed in situ separators can be made thinner than paper separators and can therefore occupy less space than a paper separator, thereby allowing more space in a battery for electrode material, and hence enabling improved battery performance. For example, the formed in situ separators may be employed to provide batteries in which the separator occupies less than 10 percent of the cell volume.

The solidified or cured separators should be mechanically tough, resistant to mechanical shock and not easily ruptured or damaged once cured. The resulting separator should also exhibit sufficient tear resistance to prevent tears across gaps between the cathode rings, cathode-to-can interfaces, or the surfaces of the anode. The separator coating composition should also solidify or cure to form a separator membrane having sufficient elasticity to sustain at least 25 percent expansion of the cathode dimensions during discharge without tearing or separating from the electrode. The separator should also exhibit sufficient penetration resistance to resist penetration by zinc dendrites and should not provide a path for formation of zinc dendrites as do paper separators. The compression strength of the separator should be sufficient to prevent squeeze-out of liquid under full compression between a discharge anode and cathode. The separator should retain efficient mechanical properties throughout the operating temperature range of −20° C. to 71° C., but also −40° C. to 85° C. abuse temperatures. The separator should also exhibit high retentiveness of electrolyte solution, even under compression and when either the anode or cathode are dried out, i.e., the separator should be the last component to dry out during cell discharge. The separator must remain dimensionally stable in the presence of 45 percent potassium hydroxide, and should not swell or shrink in the presence of water or potassium hydroxide and retain mechanical integrity. Further, the separators should preferably adhere to ring molded, and impact molded electrodes. The separators should also preferably adhere to rod-shaped, ring-shaped, strip-shaped, washer-shaped, and other shaped electrode surfaces. In addition to the above mechanical requirements, the separator should exhibit certain electrical properties. First, the separator should not be electrically conductive, i.e., it should act as an electrical insulator between the anode and cathode. The separator should maintain the electrical insulating characteristics over the projected life of the battery, which is at least about five years. The separator should also exhibit high ionic conductivity which meets or exceeds the hydroxyl ion flux density of the anode at the anode/separator interface, and which meets or exceeds the hydroxyl ion flux density of the cathode at the cathode/separator interface, i.e., the separator should not be rate limiting. The separator should also have surface-to-surface ion conducting pathways, even in partially dehydrated condition. The separator should also exhibit certain chemical properties. First, the separator must be chemically stable or inert (i.e., must not decompose) in a 45 percent potassium hydroxide solution. The separator should also exhibit chemical stability under a potential different of up to two volts. The separator should also exhibit high gas permeability. In order to prevent local conditions favorable to zinc oxide precipitation, the separator should exhibit good shorting resistance. The separator must not cause corrosion of nickel plated steel at the cathode potential, and should exhibit minimum permanent bonding of electrolyte and water. The separator should also be resistant to catalytic decomposition by the metals used in the construction of the battery.

Water and ionic transport properties are also an important consideration. Water should readily diffuse through the separator so that small concentration gradients will result in high diffusion rates. Poor diffusion would result in cell polarization under heavy drain. The separator must pass hydroxyl ions from cathode to anode and must pass potassium ions from anode to cathode. The pathway for ion transport should be somewhat tortuous. A suitable transference number of hydroxyl ion in potassium hydroxide is 0.73. The hydration number of potassium ion should be from about 1 to about 2. The separator should act as a barrier to prevent movement of electrode materials from the cathode to anode and from the anode to the cathode. Desirably, the coating compositions should offer the ability to tailor the transport characteristics.

The coating compositions of this invention may solidify or freeze to form an aqueous gel separator having a solvent content greater than 90 percent by weight. This high solvent content allows the separator to behave as an electrolyte reservoir.

It is believed that a wide variety of aqueous gels, and polymer dispersions can be formulated to achieve the desired separator characteristics. Examples of coating compositions which have been found to be suitable for forming a separator directly on the surface of a cathode including seamless gels comprising kappa-carrageenan, hydroxyethyl cellulose, and a blend of kappa-carrageenan and hydroxyethyl cellulose. Other suitable compositions may include lambda- or iota-carrageenan, other hydroxyalkyl celluloses such as hydroxymethyl- and/or hydroxypropyl cellulose, and combinations thereof. For example, kappa-carrageenan forms a strong film when cast as a 2–5 weight percent film with water. Hydroxyethyl cellulose cross-linked with vinyl sulfone forms a strong gel with very high ionic conductivity. However, separators formed from kappa-carrageenan alone are not as strong as would be desired, and separators cast from hydroxyethyl cellulose alone exhibit shrinkage which is generally more than would be desired for AAA and larger size cells, but is acceptable for smaller cells. Other coating compositions which may be employed include aqueous compositions containing polyvinylpyrrolidone, such as compositions comprised of carrageenan (e.g., kappa-, lambda, and/or iota-carrageenan) and polyvinylpyrrolidone.

It has been discovered that separator coating compositions containing a blend of kappa-carrageenan and hydroxyethyl cellulose are capable of forming separators exhibiting very high ionic conductivity with exceptional strength and shrinkage characteristics. Thus, a blend of two different polymers may be employed to provide a composition which can be used to form in situ separators having an outstanding combination of properties.

Kappa-carrageenan is a naturally occurring marine colloid. More specifically, kappa-carrageenan is a sulfur phycocolloid (a polysaccharide) occurring in algae. A major potential advantage of kappa-carrageenan as a separator is that it is a low temperature thermoformable thermoplastic gel, preferably having a melting point greater than 71° C. Other potential advantages are that it is non-toxic, water-soluble very low in cost, and readily available commercially. The separators may be cast from a coating composition containing approximately 1 to 10 percent, and more desirable 2 to 5 percent, by weight of the composition. However, higher and lower concentrations may be used.

Hydroxyethyl cellulose is a non-ionic, water-soluble, cellulose ether. The potential advantage of hydroxyethyl cellulose as a battery separator material are that is it water-soluble, low cost, commercially available, can be chemically cross-linked (with divinylsulfone, for example) and is compatible with other aqueous based polymers. A suitable separator coating composition which can be used to form a battery separator may be compared as a 5 weight percent mixture of hydroxyethyl cellulose in water, although higher and lower concentrations may also be used. Divinylsulfone cross-linking agent is desirably added to the coating composition in an amount of from about 0.05 to about 2 percent of the weight of the hydroxyethyl cellulose, and more desirably from about 0.10 to about 1 weight percent. In general, higher amounts of cross-linking agent provide separators which exhibit higher electrical resistance and greater strength at the expense of ionic conductivity.

Another material which has been found suitable for preparing a separator directly on a cathode surface is cellulose viscose. Cellulose viscose is a viscous liquid consisting of concentrated aqueous alkali containing a solution of cellulose/xanthate complex. It can be coagulated in dilute (e.g., 10 percent) sulfuric acid to form regenerated cellulose. The potential advantages of cellulose viscose are that it is water soluble, low cost, stable to concentrated alkali, and has an existing performance record in alkaline batteries. Separators can be cast from solutions containing about 5 weight percent cellulose/xanthate complex, although higher and lower concentrations may also be used.

Examples of other materials which can be used in the preparation of the coating compositions which are applied to the cathode to form a separator include various synthetic polymers prepared as aqueous dispersions. Examples include aqueous dispersions of cellulose, polyurethane, acrylic polymers, polyvinyl acetate, and epoxy polymers; and dispersions of cellulose in polar organic solvents such as N-methyl morpholine oxide.

The coating compositions may contain fibers, such as wood pulp, polyolefin, cellulose, cotton, rayon, boron, boron carbide, boron nitride, carbon, aluminum silicate, and/or fused silica fibers. Polyolefin fibres include halogenated polyolefin fibres, such as those prepared from fluorinated polypropylene. The amount of fiber in the composition is desirably from about 3 percent to about 50 percent, and more preferably from about 3 percent to about 20 percent of the weight of the polymer or gel material in the composition. Fibers are included to provide physical barrier integrity, and to reinforce and structurally strengthen the separator.

Particularly preferred coating compositions are those comprising kappa-carrageenan, hydroxyethyl cellulose, and cellulose fibers. The hydroxyethyl cellulose, kappa-carrageenan, and cellulose fibers are preferably dispersed in water to form the separator coating composition. The weight ratio of hydroxyethyl cellulose to kappa-carrageenan is preferably from about 1:3 to 3:1, and more preferably from about 1:1 to about 3:1, although higher and lower ratios may also be used. The amount of hydroxyethyl cellulose and kappa-carrageenan in the coating composition may vary considerably, but is generally from about 1 percent to about 10 percent by weight, although higher and lower concentrations may also be used. Cross-linking agents such as divinylsulfone may be employed in amounts up to about 2 percent of the weight of the composition. Another suitable cross-linking agent which may be employed is trishydroxy methyl cyanurate, which is commercially available from American Cyanamid and sold under the trademark CYMEL®. The coating compositions preferably have a solvent content greater than 50 percent by weight during application.

The invention will now be described with reference to the following non-limiting examples.

EXAMPLES

Fabrication of Functional Batteries

Three master batches of separator coating compositions were prepared The first coating composition contained 5 percent by weight kappa-carrageenan in water. The second coating composition contained 5 weight percent hydroxyethyl cellulose in water with 1 weight percent potassium hydroxide. The third coating composition was a 3:1 mixture of the kappa-carrageenan master batch to the hydroxyethyl cellulose master batch. The kappa-carrageenan and kappa-carrageenan hydroxyethyl cellulose blends were heated above 90° C. to melt the kappa-carrageenan and were held between 90° C. and 100° C. in a double boiler. A stainless steel ram was fabricated that was 40 mils smaller in diameter than the inside diameter of a D cell cathode. The ram or mandrel was mounted in a collet on a vertical milling machine. A V-block was positioned on a machine table such that when a D cell was clamped in the V-block the center line of the ram was in line with the center of the cell. A spindle stop on the machine was set so that the ram would stop approximately $\frac{1}{16}$ inch above the bottom of the can. With this configuration, the formed separator was to be 0.020 inches thick on the cathode surface and 0.062 inches thick on the bottom. The separator could actually be significantly thinner than this. However, during the developmental work it was preferable to have a thicker separator than needed to compensate for any tooling inaccuracies, cathode particle entrapment, bubbles in the liquid separator, etc. Separators were formed from the kappa-carrageenan coating composition and from the kappa-carrageenan/hydroxyethyl cellulose blend in the cells by filling the cells to the top with the liquid separator coating composition and lowering the ram into the cathode. As the ram entered the cathode, excess liquid flowed out. After the separator material cured or solidified, the ram was removed. In the case of the hydroxyethyl cellulose formulation, vinyl sulphone cross-linker was added and mixed prior to pouring the material into the cathodes. The filling and ram forming process was performed twice on each cell in order to fill any voids that might be caused by air bubbles, uneven separator material flow, etc. Anode paste was added to fill the cells to the top of the cathode and collector assemblies were placed on the cells.

Nine cells were formed with the kappa-carrageenan separator material. All of the cells had an initial voltage of from 1.51 to 1.64 volts. Seven functional cells were put on 71° C. shelf-life testing. Two of the cells had OCV above 1.2 after storage for five weeks at 71° C.

Four cells were made using the kappa-carrageenan/hydroxyethyl cellulose blend. Two of the cells had an initial voltage above 1.5. The other two cells have voltages below 1.2.

Based on these tests, it was determined that battery separator membranes made from kappa-carrageenan coating compositions and kappa-carrageenan/hydroxyethyl cellulose coating compositions can be used in alkaline cells. These tests also demonstrated that the ram molding process for forming the separator membranes is workable.

Fabrication of AA Batteries

AA alkaline batteries were prepared as follows. A five weight percent solution of kappa-carrageenan in water was prepared. The kappa-carrageenan solution was held at 90° C. in a hot water bath. A large syringe with a hypodermic needle was filled with the kappa-carrageenan solution. The kappa-carrageenan coating composition was introduced to the bottom of the AA can containing the cathode. The can containing the cathode was filled to the top with the kappa-carrageenan coating composition. This eliminated the need for accurately metering the kappa-carrageenan. During the molding process, the excess was allowed to flow over the top of the can. Immediately after the kappa-carrageenan was introduced, the molding ram was lowered into the cathode and the kappa-carrageenan coating composition flowed between the outer surface of the ram and the inner surface of the cathode. After the coating composition solidified, the ram was raised, and the cathode was removed from the ram. Excess kappa-carrageenan material was removed from the area above the cathode shelf. Anode paste was introduced into the cathode having the separator formed directly thereon, and a collector assembly was placed on the can and pressed in place using a small hand press. The cells were tested for open circuit voltage immediately after fabrication and for a short period thereafter. The cells were put on 71° C. shelf-testing and 71° C., 0.8 volts post-partial discharge (PPD) testing. Controls were made by adding anode paste to cathodes lined with conventional paper separators and by pressing collector assemblies in place.

One hundred three (103) operational cells were made with kappa-carrageenan separators. All of the kappa-carrageenan separators were fabricated using the ram molding technique. These tests proved that operational batteries could be fabricated with separator membranes that are made by applying a coating composition to the cathode surface and allowing the coating composition to solidify.

Fabrication of Alkaline Cells Having Kappa-Carrageenan/Hydroxyethyl Cellulose Blend Separators Two master batches were prepared, including a first containing 5 percent kappa-carrageenan in water, and a second containing 5 percent hydroxyethyl cellulose in water (both on a weight basis). The pH of the hydroxyethyl cellulose batch was increased to 12 by addition of solid potassium hydroxide. The batches were mixed in a ratio of three parts of the composition containing the kappa-carrageenan to one part of the composition containing the hydroxyethyl cellulose. The AA batteries were prepared in accordance with the method described above. Sixty operational cells were made with the kappa-carrageenan/hydroxyethyl cellulose blend separators, and fifty controls were made with conventional paper separators. The open circuit voltages for the batteries containing the kappa-carrageenan/hydroxyethyl cellulose separators were comparable to conventional batteries containing a paper separator.

Centrifugally Cast Separators

A kappa-carrageenan/hydroxyethyl cellulose blend as described above was successfully centrifugally cast on the inner surface of a cathode for a cylindrical AA alkaline cell. The AA cells were inserted into a support fixture that was mounted to the output shaft of a DC motor and rotated at approximately 20° to horizontal. The axis of rotation was coincident with the longitudinal axis of the cylindrical cell. The coating composition containing kappa-carrageenan and hydroxyethyl cellulose was introduced into the cathode using a syringe as previously described. The cell was then rapidly accelerated to 2500 rpm and held at that speed for approximately two minutes, causing the liquid to flow up the sides of the cathode and to solidify or set-up. In order to avoid complications of measuring the amount of liquid injected into the cell, the cells were overfilled. During the spinning operation, the excess liquid exited from the top of the cell. After the separators set-up, the cathodes were removed from the spinning fixtures, and additional potassium hydroxide was added. The anode paste was then added along with additional potassium hydroxide, and the collector was installed. Eleven operational cells were produced by the centrifugal casting technique. This test demonstrated that centrifugal casting can be effectively used for applying a coating composition to a cathode surface to form a separator directly on the cathode surface.

Polyvinyl Acetate Separators

The above centrifugal casting process was repeated using a polyvinyl acetate aqueous dispersion. Three operational cells were made with polyvinyl acetate membranes.

Fabrication of Cells Using Separator Coating Composition Containing Solid Cellulose Fibers A master batch of 5 percent kappa-carrageenan (weight basis) in water was prepared at 90° C. A master batch of five percent hydroxyethyl cellulose (by weight) in 1 percent potassium hydroxide (by weight) was prepared. The kappa-carrageenan composition and the hydroxyethyl cellulose composition were mixed in a 3:1 ratio at 90° C. To this blend was added 15 percent cellulose fiber by weight. Ram molding, as described above, was used for preparing AA cells having a separator formed from the coating composition containing kappa-carrageenan/hydroxyethyl cellulose/cellulose fiber. Seventy-seven operational cells were prepared with the kappa-carrageenan/hydroxyethyl cellulose/cellulose fiber blend. Nine or ten batteries subjected to a 71° C. shelf test were operational for eight weeks, and four of five batteries subjected to a 0.8 volt PPD tested were operational.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A battery comprising first and second electrodes, an alkaline electrolyte, and an ionically conductive separator disposed between the electrodes, the separator being formed by applying a coating composition to the surface of at least one of the electrodes and solidifying material contained in the coating composition, the coating composition comprising a gel or polymer dispersed in a polar solvent, wherein the separator occupies less than 10 percent of the volume of the battery and said separator has a solvent content greater than 90% by weight.

2. The battery of claim 1, wherein the separator is in contact with both of the first and second electrodes.

* * * * *